United States Patent

Spetz

[15] 3,701,167
[45] Oct. 31, 1972

[54] PRE-CONSTRUCTED BUTTONHOLE AND METHOD OF INCORPORATING SAME IN A GARMENT

[72] Inventor: Mary Ann Spetz, 5675 Fiercier Court, Utica, Mich. 48087

[22] Filed: May 7, 1971

[21] Appl. No.: 141,293

[52] U.S. Cl.......................................2/266, 156/253
[51] Int. Cl..............................................A41f 1/02
[58] Field of Search ....2/266, 243; 112/264; 156/253

[56] References Cited

UNITED STATES PATENTS

| 1,066,477 | 7/1913 | Feder | 2/266 X |
| 2,731,644 | 1/1956 | Matthies | 2/266 |
| 2,922,167 | 1/1960 | Berlin | 2/266 X |
| 3,536,554 | 10/1970 | Weiss | 2/266 X |
| 3,547,060 | 12/1970 | Lepore | 2/266 X |
| 3,587,501 | 6/1971 | Cruden | 2/266 X |

Primary Examiner—Alfred R. Guest
Attorney—Irving M. Weiner

[57] ABSTRACT

A pre-constructed buttonhole consisting of components independent of an article to which they are to be attached, and a method for incorporating the components into a material to form a finished buttonhole. The components consist of a reinforcing piece disposed on the surface opposite the exterior finished surface of the article, and buttonhole pieces having tab-portions disposed on the finished surface of the article. A slit is made which extends through the reinforcing piece and layers of material composing the article. The tab portions of the buttonhole pieces are inserted through this slit to the exterior finished surface of the article and affixed thereto to form a buttonhole. The buttonhole components are manufactured from continuous strips of material. The individual components may be separated prior to being placed in the hands of the user.

9 Claims, 13 Drawing Figures

PATENTED OCT 31 1972 3,701,167

INVENTOR
MARY ANN SPETZ
By *Irving M. Weiner*
ATTORNEY

INVENTOR
MARY ANN SPETZ

PRE-CONSTRUCTED BUTTONHOLE AND METHOD OF INCORPORATING SAME IN A GARMENT

BACKGROUND OF THE INVENTION

1. Field of the Invention

The present invention pertains to the field of art encompassing making an opening in a material for decorative or functional purposes, especially that part of the field pertaining to making buttonholes in wearing apparel. The present invention may be used to make decorative and/or functional buttonholes in any material capable of being slit.

2. Description of Prior Art

There are prior art methods and devices for making simplified buttonholes, such as attachments for sewing machines, special dies used to emboss buttonhole forms, and various methods utilizing patches of fabric sewn or bonded to the material in which a buttonhole is to be placed, all of which require varying degrees of skill and dexterity of manipulation. No prior art method or device is capable of doing what the present invention can do, viz., to make a professional appearing "worked" type buttonhole without the use of a sewing machine attachment or special equipment, adaptable to any material from which a garment can be made, and installable in areas where it has been heretofore impossible to install durable buttonholes.

SUMMARY OF INVENTION

The present invention provides a pre-constructed buttonhole for installation in a material, such as wearing apparel, including a buttonhole reinforcement piece adapted to be affixed to the material such that it will not be visible from the exposed surface of the material. The reinforcing piece has a cutting guide line adapted to aid making uniform slits in the material. Substantially identical buttonhole pieces having tab portions adapted to pass through the buttonhole slit are themselves adapted to be affixed to the material.

The present invention also provides a buttonhole attached to a material, such as wearing apparel, including a buttonhole reinforcement piece located in a selected area of the material such that it is not visible from the exterior finished surface of the material, and the buttonhole pieces with tab portions also located on the material such that they are not visible from the exterior finished surface of the material except for the tab portions which extend through the buttonhole slit and are affixed to the exterior finished surface of the material.

In addition, the present invention provides a pre-constructed buttonhole for installation in a material consisting of buttonhole pieces with tab portions. The buttonhole pieces being adapted to be affixed to the material such that they will not be visible from the exterior finished surface of the material except for any tab portion which extends through the buttonhole slit and are adapted to be affixed to the exterior finished surface of the material.

The present invention also provides a method for installing a pre-constructed buttonhole in a material such as wearing apparel. The method includes the steps of placing a buttonhole reinforcement piece on the material such that it is not visible from the exterior finished surface of the material and affixing it to the material by applying heat to a heat activated adhesive. Then, using a pre-measured cutter, a slit is cut through the buttonhole reinforcement and material. Next, any interfacing and facing material that is used is placed over the material to which the buttonhole reinforcement piece is affixed, and in juxtaposition thereto. A slit, aligned with the previously made slit through the buttonhole reinforcement piece, is cut with a pre-measured cutting instrument through the interfacing and facing material. The tab portions of the buttonhole pieces are then inserted through the slit and folded over on the exterior front surface of the material. Heat is next applied to fix the buttonhole pieces in place on the exterior and interior finished surfaces of the article, and encompassing any and all layers of material in between.

In addition, the present invention provides a method of manufacturing the components of a pre-constructed buttonhole, consisting of a buttonhole reinforcement piece fabricated from continuous yardages of material on which are placed buttonhole cutting guide lines to aid in separating the continuous yardages of material into separate buttonhole reinforcement components, an heat-activated adhesive on the surface opposite the cutting guide lines. The buttonhole pieces are fabricated by embroidering continuous patterns of tab portions on continuous yardages of material on which are placed cutting guide lines to aid in separating the continuous yardage of material into separate buttonhole pieces. A heat-activated material is applied to the "wrong" side of the embroidered material. An alternate method of manufacturing the buttonhole pieces is to weave continuous strips of material, one edge of which is straight and the opposite edge having exposed tab portions.

DESCRIPTION OF SOME PREFERRED EMBODIMENTS

Figure 1:
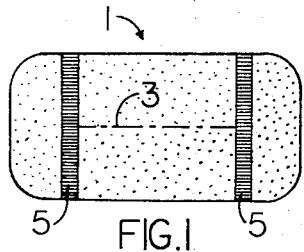
FIG. 1 is a top view of the reinforcement piece or first component according to one possible embodiment of the present invention.

With reference to the FIG. 1, there is shown one embodiment of the first component or reinforcement piece 1. This first component 1 is constructed of a substance suitable for the material on which it is to be installed. Disposed on the first component 1 is a buttonhole cutting guideline 3 to aid in cutting a buttonhole slit, and a plurality of stitches 5 which define the length of the buttonhole slit and act as reinforcements. Disposed on the surface opposite the cutting guideline 3 is a heat-activated adhesive 6 (see FIGS. 6 and 7).

Figure 2A:
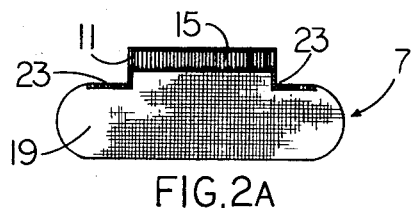
FIGS. 2A and 2B are top views of substantially identical buttonhole pieces or second and third components according to one possible embodiment of the present invention.
Figure 2B:
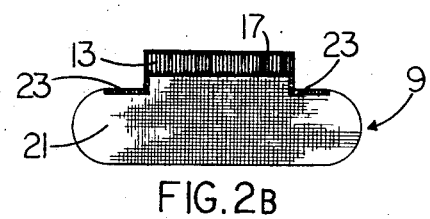

FIGS. 2A and 2B illustrate an embodiment of substantially identical second and third components or buttonhole pieces 7 and 9, respectively. These components 7 and 9 are constructed of a substance suitable for the material on which they are to be installed. Located on the components 7 and 9 are tab portions 11 and 13 of a depth appropriate for the thickness of the material on which they are to be placed, and to allow the tab portions 11 and 13 to extend through the material and to be folded on the outside surface of the material. Close stitching 15 and 17 of a thread suitable in weight and color for the intended application is located along the tab portions 11 and 13, respectively. Disposed on one surface of the components 7 and 9 is a heat-activated adhesive 19 and 21, respectively.

If desired, the land portions 23 adjacent the tab portions 11 and 13 of the buttonhole pieces 7 and 9 may be finished with a stitching. The stitching 15 and 17 may be made from the same continuous thread used for the land portions 23 to keep the ends of the stitching 15 and 17 from falling off the tab ends.

Figure 3A:
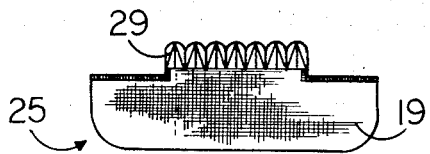
FIGS. 3A and 3B are top views of substantially identical buttonhole pieces or second and third components according to another possible embodiment of the present invention.

FIGS. 3A and B illustrate another embodiment of substantially identical second and third components 25 and 27 with scalloped tab portions 29 and 31, respectively. By varying the pattern of the tab portions, different decorative designs can be achieved when the button hole is viewed from the outside of the material on which it is installed.

Figure 4:
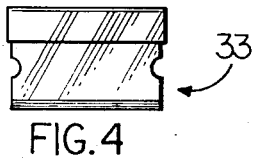
FIG. 4 is a side view of the pre-measured cutting blade according to one possible embodiment of the present invention.

Illustrated in FIG. 4 is a pre-measured cutting blade 33 which may be used in making a slit in the material and in the first component 1. The blade 33 is the same length as the cutting guideline 3 (see FIG. 1).

Figure 5:
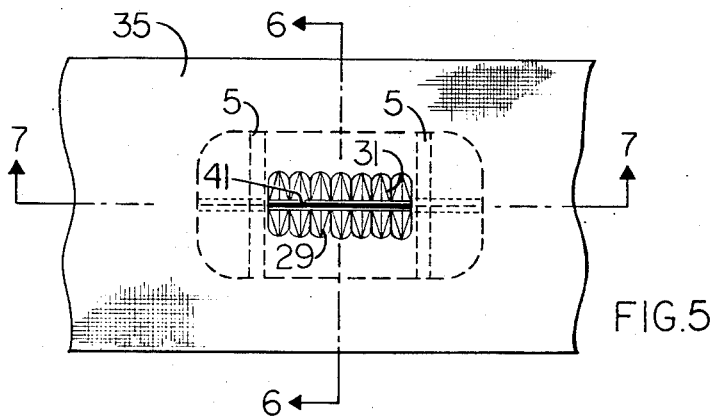
FIG. 5 is a top view of one possible embodiment of the present invention installed in a portion of material.
Figure 6:
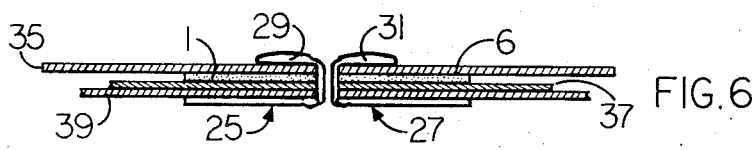
FIG. 6 is a sectional view, taken along line 6—6 of FIG. 5, of the present invention installed in a portion of material.
Figure 7:
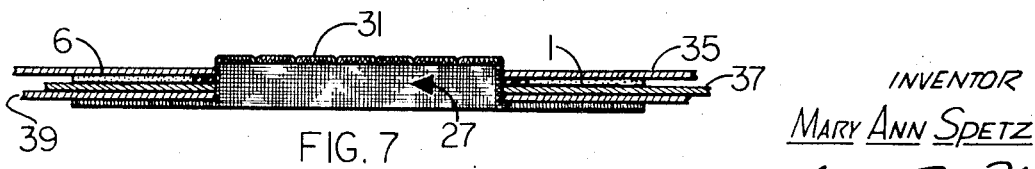
FIG. 7 is a sectional view, taken along line 7—7 of FIG. 5, of the present invention installed in a portion of material.

Referring now to FIGS. 5, 6 and 7, one form of a buttonhole construction of the present invention formed in a material or garment piece 35 is shown. Insofar as the material in which the buttonhole is to be installed is concerned, it is understood that the buttonhole may be installed in any material of varying thickness or plurality of layers. In the description of the method to follow reference will be made to a plurality of layers. However, the present invention and method may be employed with a single layer of material.

As shown on FIGS. 5, 6 and 7, a material or outside garment piece is indicated at 35. The first component 1 and the second and third components 25 and 27 are disposed in a concealed relationship to the outside surface of the garment piece 35 except for the tab portions 29 and 31 of the components 25 and 27 which protrude through and are affixed to the outer surface of the garment piece 35.

As illustrated in FIGS. 6 and 7, the material in which the buttonhole is to be installed includes a garment piece 35, an interfacing material 37, and a facing material 39. In the installation of the pre-constructed buttonhole of the present invention, the first component 1 is secured to the garment piece 35 such that it will not be visible from the outside surface making sure the side on which is disposed the adhesive 6 is in juxtaposition to the garment piece 35. Heat is applied to the first component 1 to activate the heat-activated adhesive 6, thus fixing the first component 1 to the garment piece 35. Care should be taken when applying the heat to avoid scorching.

The pre-measured cutting blade 33 (see FIG. 4) is placed on the cutting guideline 3 (see FIG. 1) and struck on the top with a hammer or other suitable object, thus making a slit 41 (see FIG. 5) through the first component 1 and the garment piece 35. Care should be exercised to avoid cutting the stitches 5 (see FIG. 1).

At this point, if interfacing and facing materials 37 and 39 are being used in the making a new garment, the construction of the garment should go to completion prior to taking the subsequent steps of installing the buttonhole.

The interfacing material 37 and the facing material 39 are next placed smoothly in place over the first component 1 and the garment piece 35, and temporarily pinned to the garment piece 35 to assure that there is no relative movement between them during the succeeding steps to be taken.

The cutting blade 33 (see FIG. 4) is placed into the previously made slit 41 (see FIG. 5) from the outside surface of the garment piece 35 and again struck on the top with a hammer to drive it through the interfacing material 37 and the facing material 39.

Figure 3B:
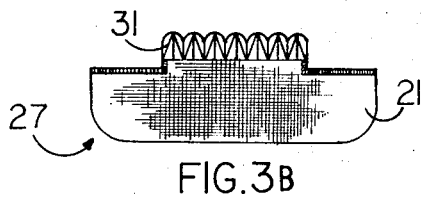

Next, the second and third components 25 and 27 are placed together such that the top edge of the tab portions 29 and 31 are even, and the surfaces on which is disposed the heat-activated adhesive 19 and 21 (see FIGS. 3A and 3B) are exposed in opposite relationship.

The tab portions 29 and 31 are inserted through the slit 41 and protrude from the outside surface of the garment piece 35.

The protruding tab portions 29 and 31 are folded in opposite directions to each other on the outside surface of the garment piece 35 as shown in FIGS. 5 and 6. Similarly, the portions of the components 25 and 27 which protruded from the facing material 39 are folded in opposite directions to each other.

Heat is next applied to either the outside surface of the garment piece 35 or the exposed surface of the facing material 39 to secure the tab portions 29 and 31 and the folded portions of the components 25 and 27 in place. Care should be exercised to avoid scorching.

If the pre-constructed buttonhole is installed in a material 35 with a nap, such as corduroy, velvet, velveteen, or a rough material, such as terrycloth, or a thick fabric it may be desirable to sew around the periphery of the exposed tab portions 29 and 31 through the entire material or garment to assure proper installation.

Various modifications such as different shapes of the components 1, 7, 9, 25 and 27; tab portions 11, 13, 29 and 31; as well as slight changes in the installation procedure, such as replacing the pre-measured cutting edge blade 33 with a cutting instrument of any dimension, will occur to those skilled in the art and are within the scope of the present invention and the appended claims.

Figure 8:
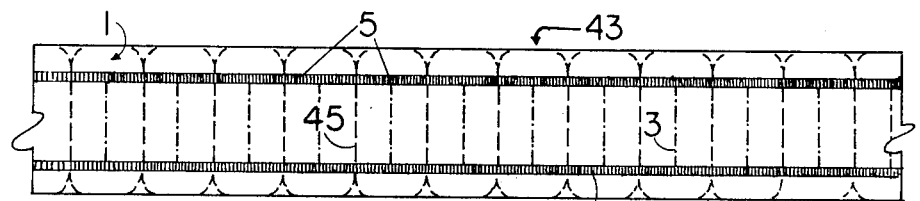
FIG. 8 is a top view of a continuous strip or wide yardage of material incorporating a plurality of reinforcement pieces according to one possible embodiment of the present invention.

Shown in FIG. 8 is an embodiment of continuous strips or wide yardages of a suitable material 43 which incorporate a plurality of buttonhole reinforcement pieces 1. Located at desired intervals on the continuous yardages of material 43 are buttonhole cutting guidelines 3, rows of parallel stitching 5 which define the length of the buttonhole in the buttonhole reinforcement piece 1, and cutting guidelines 45 which act as guides for cutting the continuous yardage of material 43 into individual buttonhole reinforcement pieces 1.

Figure 9:
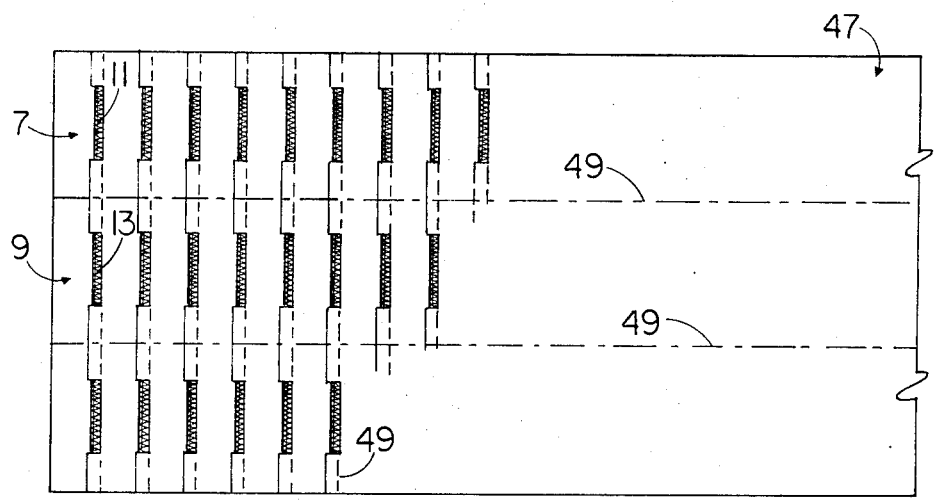
FIG. 9 is a top view of a continuous strip or wide yardage of material incorporating a plurality of buttonhole pieces as they appear when patterns of individual tab portions are embroidered.

In FIG. 9 there is shown an embodiment of continuous strips of wide yardages of a suitable material 47 which incorporates a plurality of substantially identical buttonhole pieces 7 and 9. Disposed on the continuous yardage of material 47 are continuously embroidered patterns of individual tab portions 11 and 13. Cutting guidelines 49 may be imprinted to act as guides for cutting the continuous yardage of material 47 into individual buttonhole pieces 7 and 9.

Figure 10:
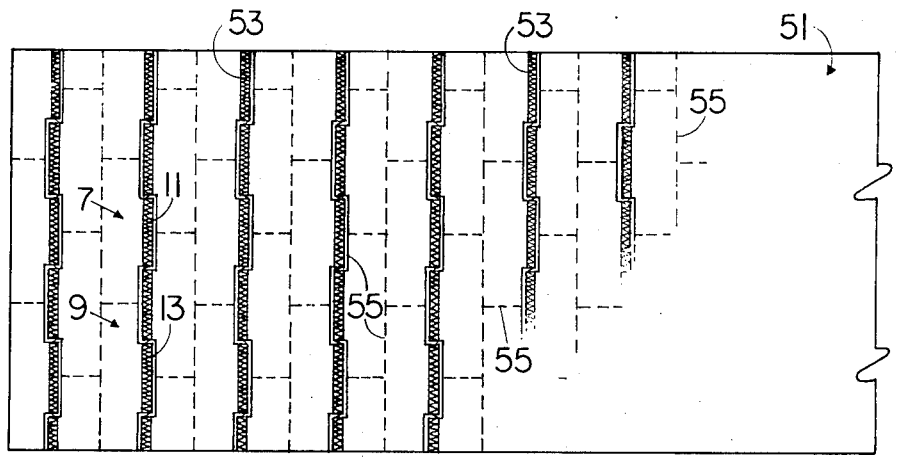
FIG. 10 is a top view of a continuous strip or wide yardage of material incorporating a plurality of buttonhole pieces as they appear when continuous rows of embroidery are made to accomplish a "nested" layout of tab portions.

FIG. 10 illustrates another embodiment of continuous strips or wide yardages of a suitable material 51 which incorporates a plurality of substantially identical buttonhole pieces 7 and 9. Disposed on the continuous yardage of material 51 are continuous rows of embroidery 53 to accomplish a "nested" layout of tab portions 11 and 13 conserving material. Cutting guidelines 55 may be applied, for example, by imprinting, to act as guides for cutting the continuous yardage of material 51 into individual buttonhole pieces 7 and 9.

Figure 11:
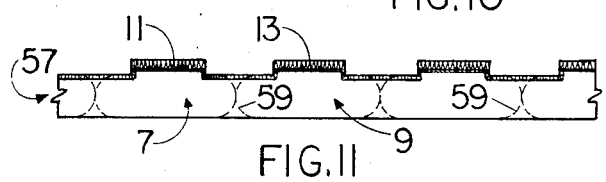
FIG. 11 is a top view of a continuous strip of material incorporating a plurality of buttonhole pieces as they appear when the material is formed to expose the tab portions prior to the embroidery operation.

Shown in FIG. 11 there is another embodiment of a continuous strip of suitable material 57 incorporating a plurality of substantially identical buttonhole pieces 7 and 9 which have been formed to expose tab portions 11 and 13. Embroidery is placed on the exposed tab portions 11 and 13, and cutting guidelines 59 are imprinted on the surface of the material 57 to act as guides for cutting the material into individual buttonhole pieces 7 and 9.

It should be noted that when cutting the continuous strips or wide yardages of material into individual first, second and third components, all corners should be as round as possible to prevent "corner lift off" when the components are affixed to the material.

Numerous alterations in the layout of tab portions, methods of forming the strips of material encompassing the buttonhole components, and the like will be suggested to those skilled in the art upon reading this disclosure. However, it is to be understood that the invention in relating to preferred embodiments is for the purposes of illustration only. All modifications which relate to the spirit of the invention are intended to be included within the scope of the appended claims.

I claim:

1. A pre-constructed buttonhole device which is adapted to be secured to a material, comprising in combination:

a first component which is adapted to be secured to the back surface of said material and which is provided with a visible buttonhole cutting guideline;

second and third components, each of which is provided with a tab portion having a length that is shorter than the length of said cutting guideline;

said second and third components being adapted to be affixed to said material; and each said tab portion being adapted to pass through a slit made in said material and said first component with the aid of said guideline and being adapted to be affixed to the front of said material.

2. A pre-constructed buttonhole device according to claim 1, wherein:

a plurality of spaced apart stitches on said first component define the buttonhole length and act as reinforcements for the buttonhole.

3. A pre-constructed buttonhole device according to claim 1, wherein:

a heat-activated adhesive applied to one surface of said first component acts as a bonding agent between said first component and said material; and a heat-activated adhesive applied to one surface of said second and third components acts as a bonding agent between said second and third components and said material.

4. A buttonhole attached to a material, comprising in combination:

a first component disposed in a selected area of said material in a concealed relationship to the front surface of said material;

second and third components disposed in a concealed relationship to said front surface of said material;

a slit through said material and said first component; and tab portions of said second and third components extending through said slit and affixed to said front surface of said material.

5. A buttonhole according to claim 4, wherein:

a plurality of spaced apart stitches on said first component disposed substantially perpendicular to said slit define the buttonhole length and act as buttonhole reinforcements:

a visible buttonhole cutting guideline disposed substantially perpendicular to said plurality of stitches is provided on said first component;

a heat-activated adhesive is applied to one surface of said first component as a bonding agent between said first component and said material;

said tab portions of said second and third components are of a length no longer than the length of said cutting guideline; and a heat-activated adhesive applied to one surface of the second and third components as a bonding agent between said material and said second and third components.

6. A pre-constructed buttonhole device which is adapted to be secured to a material, comprising in combination:

buttonhole pieces which are substantially identical to each other and each of which is provided with a tab portion having a length no longer than the length of the desired buttonhole;

said buttonhole pieces being adapted to be secured to said material; and said tab portions being adapted to pass through a slit made in said material and being adapted to be affixed to the front surface of said material.

7. A method of installing a pre-constructed buttonhole in a material, which comprises the steps of:

locating a first component in a concealed relationship to the outside surface of a first layer of said material;

applying heat to activate a heat-activated adhesive applied to said first component to bond said first component in place;

cutting a slit the length of the buttonhole through said first component;

inserting tab portions of second and third components through said slit in a manner such that said tab portions protrude from the outside surface of said first layer of said material;

folding said protruding tab portions of said second and third components in opposite relationship to each other;

folding the portions of said second and third components which protrude from the surface opposite said outside surface of said first layer of material in opposite relationship to each other; and applying heat to activate heat-activated adhesive applied to said second and third components to bond said second and third components in place.

8. A method of installing a pre-constructed buttonhole in a material substantially as set forth in claim 7 wherein said step of cutting a slit the length of the buttonhole in said first component is further characterized by:

cutting a slit the length of the buttonhole through said first component and through said first layer of material.

9. A method of installing a pre-constructed buttonhole in a material substantially as set forth in claim 8, further characterized by the additional steps, immediately following said step of claim 8, of:

placing interfacing and facing material in proper relationship to said first layer of material and affixing them thereto in a temporary manner; and cutting a slit the length of the buttonhole through said interfacing and through said facing material aligned with said slit in said first layer of material and said first component.

* * * * *